US011017620B1

(12) United States Patent
Kim et al.

(10) Patent No.: US 11,017,620 B1
(45) Date of Patent: May 25, 2021

(54) VEHICLE MONITORING SYSTEM

(71) Applicant: KARMA AUTOMOTIVE LLC, Irvine, CA (US)

(72) Inventors: David Kim, Irvine, CA (US); Victor Rangel, Irvine, CA (US); Armin Parsa, Irvine, CA (US)

(73) Assignee: KARMA AUTOMOTIVE LLC, Irvine, CA (US)

( * ) Notice: Subject to any disclaimer, the term of this patent is extended or adjusted under 35 U.S.C. 154(b) by 0 days.

(21) Appl. No.: 16/724,131

(22) Filed: Dec. 20, 2019

(51) Int. Cl.
*G07C 9/00* (2020.01)
*G06K 9/00* (2006.01)

(52) U.S. Cl.
CPC ..... *G07C 9/00309* (2013.01); *G06K 9/00087* (2013.01); *G06K 9/00288* (2013.01); *G06K 9/00791* (2013.01); *G07C 2009/00507* (2013.01)

(58) Field of Classification Search
CPC .................................................. G07C 9/003
See application file for complete search history.

(56) References Cited

U.S. PATENT DOCUMENTS

| 8,054,201 | B2 * | 11/2011 | Okugi | G08G 1/166 340/901 |
| 8,334,763 | B2 | 12/2012 | Jackson | |
| 8,855,621 | B2 * | 10/2014 | Chen | B60R 25/00 455/420 |
| 9,387,824 | B2 | 7/2016 | Pisz et al. | |
| 9,619,718 | B2 | 4/2017 | Michmerhuizen et al. | |
| 9,646,427 | B2 * | 5/2017 | Chen | G07C 5/008 |
| 10,259,427 | B1 * | 4/2019 | Kearney | G08B 13/19647 |
| 10,654,448 | B2 * | 5/2020 | Etonye | B60R 25/01 |
| 2014/0090039 | A1 | 3/2014 | Bhow | |
| 2014/0152422 | A1 * | 6/2014 | Breed | G07C 9/32 340/5.52 |

FOREIGN PATENT DOCUMENTS

| EP | 1 361 324 A2 | 11/2003 |
| KR | 10-2004-0093223 A | 11/2004 |
| KR | 10-2014-0032844 A | 3/2014 |
| KR | 10-2015-0108604 A | 9/2015 |

OTHER PUBLICATIONS

International Search Report and Written Opinion dated Mar. 31, 2021 issued in related International Application No. PCT/US2020/063651; filed Dec. 7, 2020.

* cited by examiner

*Primary Examiner* — K. Wong
(74) *Attorney, Agent, or Firm* — Gordon Rees Scully Mansukhani, LLP

(57) ABSTRACT

A monitoring system for a vehicle includes a sensor system and a vehicle control system. The sensor system monitors anomalies occurring on or near the vehicle and is configured to send a video and/or data feed to the vehicle control system. The user may view the video feed sent from the vehicle control system using the key fob having a display. The key fob may include a security reader that includes a fingerprint reader and/or a camera in order to authenticate the user using fingerprint data or facial data. The key fob may also be configured to control the video feed.

11 Claims, 5 Drawing Sheets

VEHICLE MONITORING SYSTEM

GENERAL DESCRIPTION

The present disclosure relates to vehicle monitoring systems. In particular, a smart key fob that is capable of displaying surveillance information from the vehicle to the user.

Current automobiles include various different sensors and monitoring systems for the passenger of the vehicle to utilize. These include driver safety systems such as forward collision warnings, automatic emergency braking, lane departure warnings. However there is now increased demand for vehicle monitoring during periods of when the vehicle is stationary or parked.

It is common for a parked vehicle to be damaged while the passengers are away. This may result in vehicle owners no knowing the source of damage caused to their vehicles. Accordingly, there is a need of increased monitoring and surveillance of parked or stationary vehicles when the user of the vehicle is not present.

BRIEF DESCRIPTION OF THE DRAWINGS

The features, aspects, and advantages of the present disclosure will become apparent from the following description, and the accompanying exemplary embodiments shown in the drawings, which are briefly described below.

DETAILED DESCRIPTION

According to one disclosed embodiment, a vehicle is equipped with a monitoring system that includes a sensor system with shock, capacitance and/or motion sensors located in different areas of the vehicle. For example, the door panels of the vehicle may include one or more of the sensor bundle (shock, capacitance, motion, optical). Other locations of the vehicle include side rear view mirrors, front and rear bumpers, or the pillars of the vehicle. The sensors measure various different types of disturbances which the vehicle may experience. The sensor readings may be sent to the vehicle control system which may send signals to a user's device (e.g., a vehicle key fob). The user device may be equipped with a display that shows data from the signals to the user. The user device may also be equipped with security authentication such as face recognition and a fingerprint reader. The provided security on the user device can provide an extra layer of protection from theft.

Figure 1:
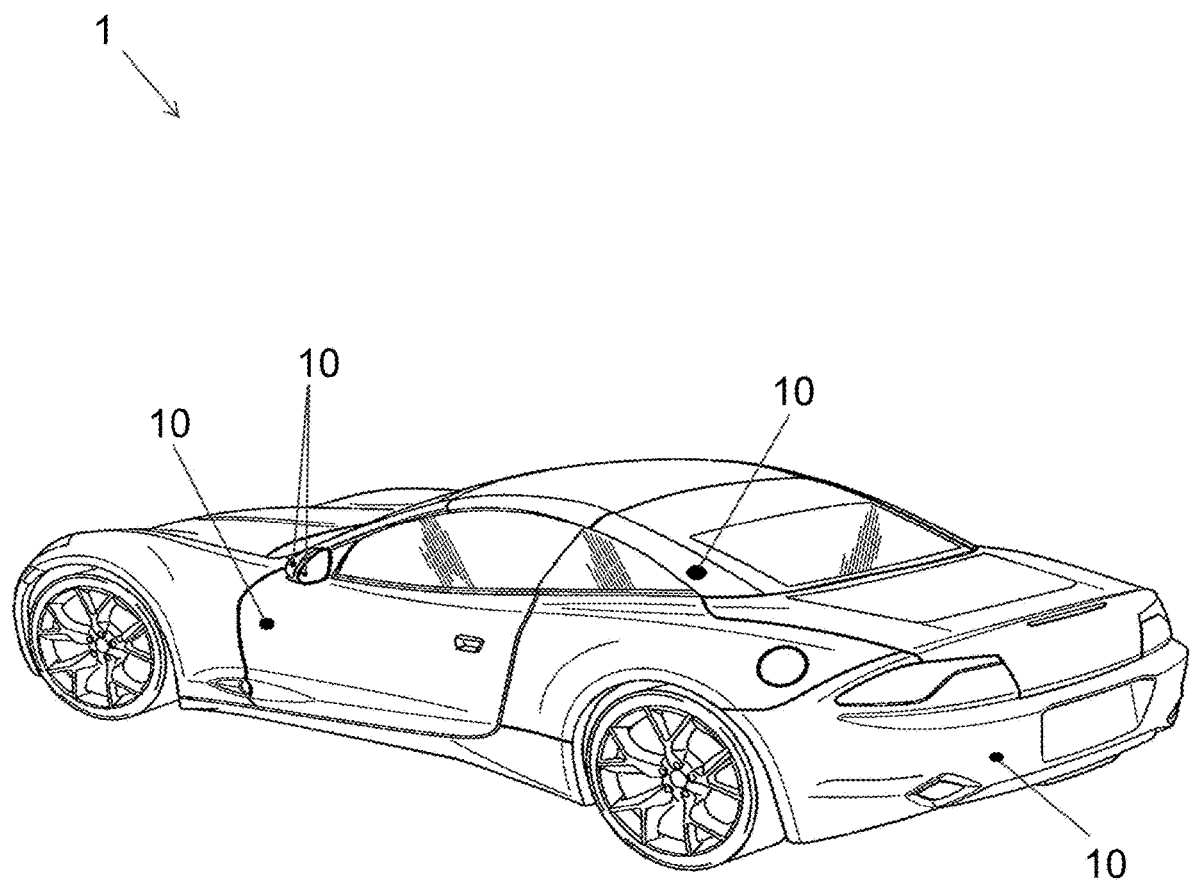
FIG. 1 is a rear side view of a vehicle with a monitoring system of an exemplary embodiment.

FIG. 1 illustrates a vehicle 1 with a vehicle monitoring system. The monitoring system includes a sensor system 10 that includes a plurality of sensor bundles that may be located on the side view mirrors, front and rear bumpers, and the pillars of the vehicle. The effective operating range of the sensors combined encompass the entire surrounding of the vehicle such that every portion of the vehicle may be monitored by the sensor system. A vehicle control system located inside the vehicle is also provided to communicate with the sensor system 10 through any known wired, wireless, or waveguide manner.

Figure 2:
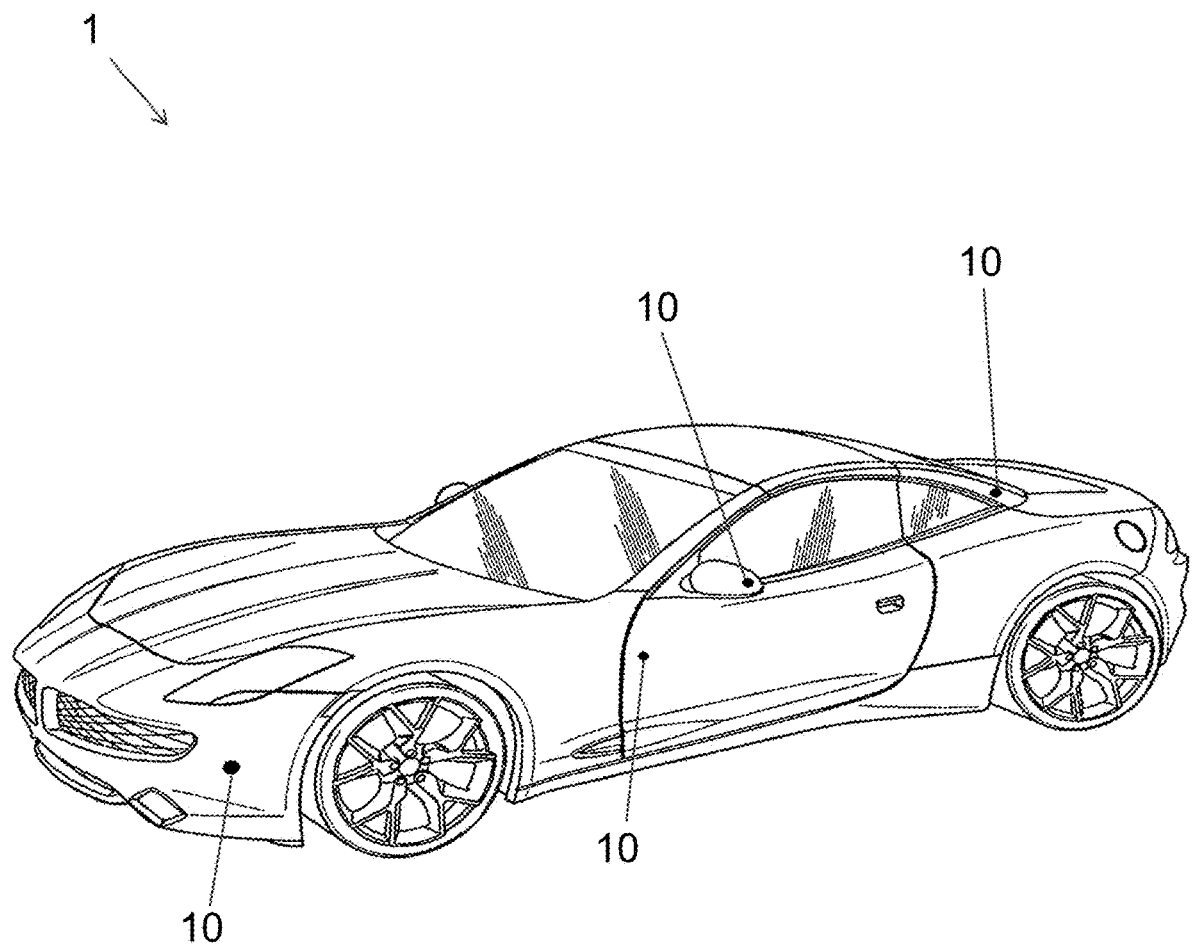
FIG. 2 is a front side view of a vehicle with a monitoring system of an exemplary embodiment.
Figure 3:
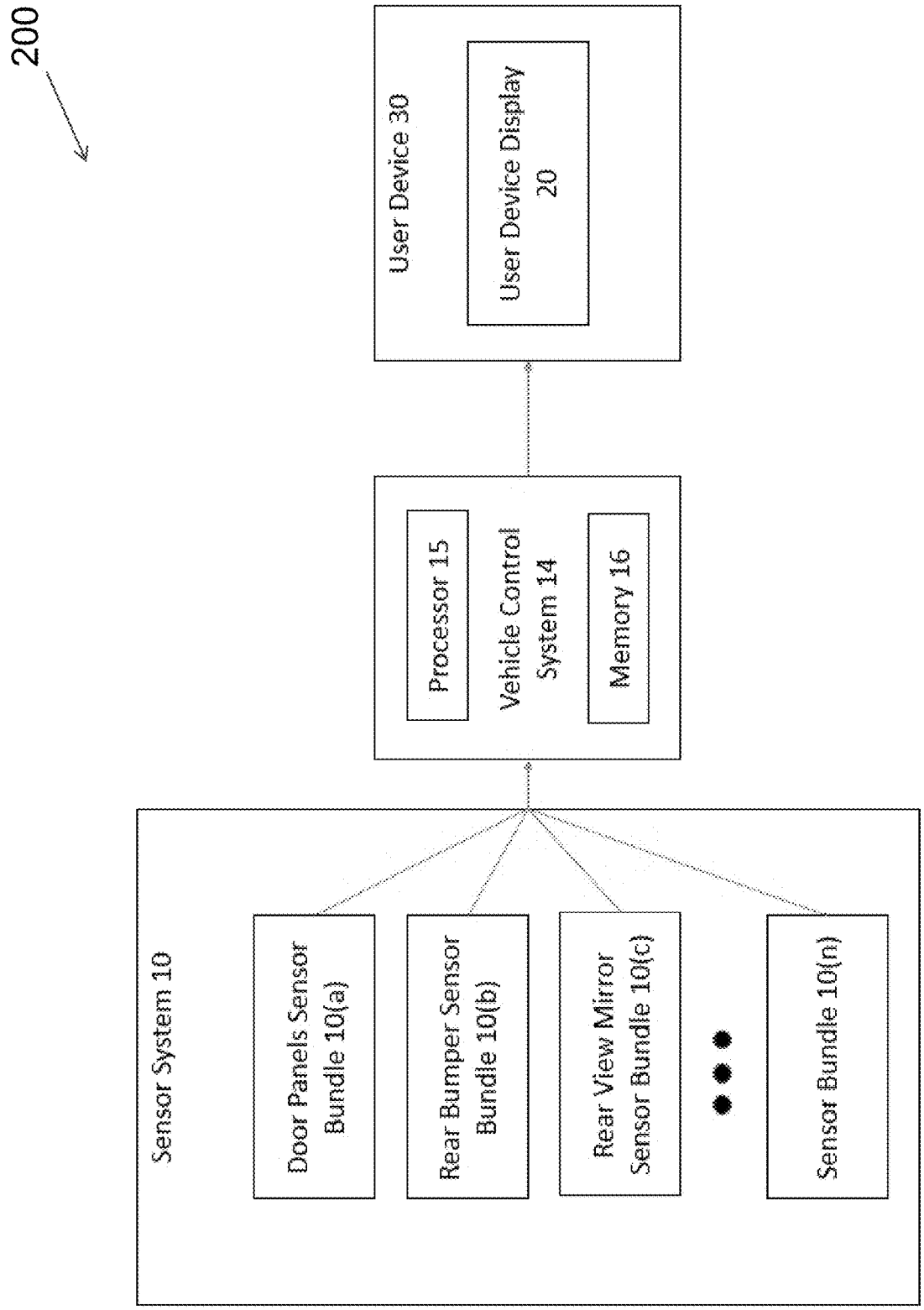
FIG. 3 is schematic of an exemplary monitoring system.

FIG. 2 shows a schematic of the monitoring system 200 of the vehicle that includes the sensor system 10 and a vehicle control system 14. The vehicle control system 14 includes a processor 15 and memory 16. The vehicle control system may include multiple systems of the vehicle such as a central infotainment unit (CIU), a driver assistance unit, and other computer based systems. The processor 15 may be a hardware processor, such as a single core or a multicore processor. For example, the processor 15 may be a central processing unit (CPU), which may include a plurality of cores for parallel/concurrent independent processing. In some embodiments, the processor 15 includes a graphics processing unit (GPU). The processor 15 is powered via a power source (e.g., a battery) of the vehicle. Although each bundle of the sensor system 10 is shown in the figures as a small area in the different locations of the vehicle, each bundle may vary in size and location. For example, the entire door panel of the vehicle may be covered with a set of sensors.

The memory 16 is in communication with the processor 15, such as in any known wired, wireless, or waveguide manner. The memory 16 may include a computer-readable storage medium, which may be non-transitory. The storage medium may be configured to store a plurality of computer-readable instructions for execution via the processor 15. The instructions may be configured to instruct the processor 15 to facilitate performance of a method for automated turn signal activation, as disclosed herein. For example, the instructions may include an operating system of the vehicle or an application to run on the operating system of the vehicle (e.g, application on a mobile device). For example, the processor 15 and the memory 16 may enable various file or data input/output operations, whether synchronous or asynchronous, including any of the following: reading, writing, editing, modifying, deleting, updating, searching, selecting, merging, sorting, encrypting, de-duplicating, or others.

The memory 16 may include at least one of a volatile memory unit, such as random access memory (RAM) unit, or a non-volatile memory unit, such as an electrically addressed memory unit or a mechanically addressed memory unit. For example, the electrically addressed memory includes a flash memory unit. For example, the mechanically addressed memory unit includes a hard disk drive. The memory 16 may include a storage medium, such as at least one of a data repository, a data mart, or a data store. For example, the storage medium may include a database, including distributed, such as a relational database, a non-relational database, an in-memory database, or other suitable databases, which may store data and allow access to such data via a storage controller, whether directly and/or indirectly, whether in a raw state, a formatted state, an organized stated, or any other accessible state. The memory 16 may include any type of storage, such as a primary storage, a secondary storage, a tertiary storage, an off-line storage, a volatile storage, a non-volatile storage, a semiconductor storage, a magnetic storage, an optical storage, a flash storage, a hard disk drive storage, a floppy disk drive, a magnetic tape, or other suitable data storage medium. The memory 16 is powered via the power source of the vehicle.

The sensor system 10 includes sensor bundles 10(a), 12(b), 13(c) . . . 10(n) located at different locations of the vehicle. Each sensor bundles 10(a), 10(b), 10(c) . . . 10(n) include shock, capacitance, motion, and optical sensors to monitor different anomalies proximate the vehicle. The shock, capacitance, motion, and optical sensor uses known sensor methods in order to measure different types of readings for different events. Each of the shock, capacitance, motion, and optical sensors of the sensor system 10 are in communication with the control system 14, such as in any known wired, wireless or waveguide manner. The different sensors as described above will work in tandem to monitor different anomalies or disturbances experienced by the vehicle. Anomalies may be any event proximate the vehicle that are of interest that may impact the vehicle negatively. Anomalies, for example, may include approaching person(s) or objects such as shopping carts or other vehicles, impact from vehicles or objects such as a person hitting or keying the vehicle. The shock sensors may monitor any physical impact experienced by the vehicle. The capacitance sensors will monitor contact with conductive objects such as metal keys or shopping carts or contact from a person touching the vehicle. The motion sensors will monitor movement of objects or personnel approaching or in close proximity of the vehicle.

The optical sensor of the sensor system 10 will always be active in order to record the vehicle activity during the anomaly. The optical sensor continuously stores optical data onto the memory 16 of the vehicle control system 14. Once one of the sensors of the sensor system 10 senses the anomaly, the vehicle control system 14 will send optical sensor video feed of the affected area of the vehicle to the user display 20. The user display 20 is in communication with the control system 14, such as in any known wireless or waveguide manner. The optical sensor may store video feed onto the memory 16. When the processor of the sensor system 10 sends the video feed from the memory to the user display 20, the video feed sent may be sent a certain time period before the anomaly in order for the user to see a replay of the event. The user may customize the video feed sent, for example, the length of the feed or how far in the past the video feed should start when the anomaly event is read by the sensor system 10.

The user may also activate or deactivate different sensor (s) of sensor system 10 through a user interface located inside the vehicle configured to communicate to vehicle control system 14 through known wired, wireless, or waveguide manner or an application on a mobile device configured to communicate with the vehicle control system 14 through known wireless or waveguide manner. For example the user may not want to monitor movement around the vehicle when parked in crowded areas since the vehicle control system will be continuously sending unwanted video feed from the optical sensor of sensor system 10, therefore the user may configure the settings on the vehicle user interface or the mobile device such that the vehicle control system 14 will communicate with sensor system 10 to shut off the motion sensors of the sensor system 10 through known wired, wireless, or waveguide manner.

Figure 4:
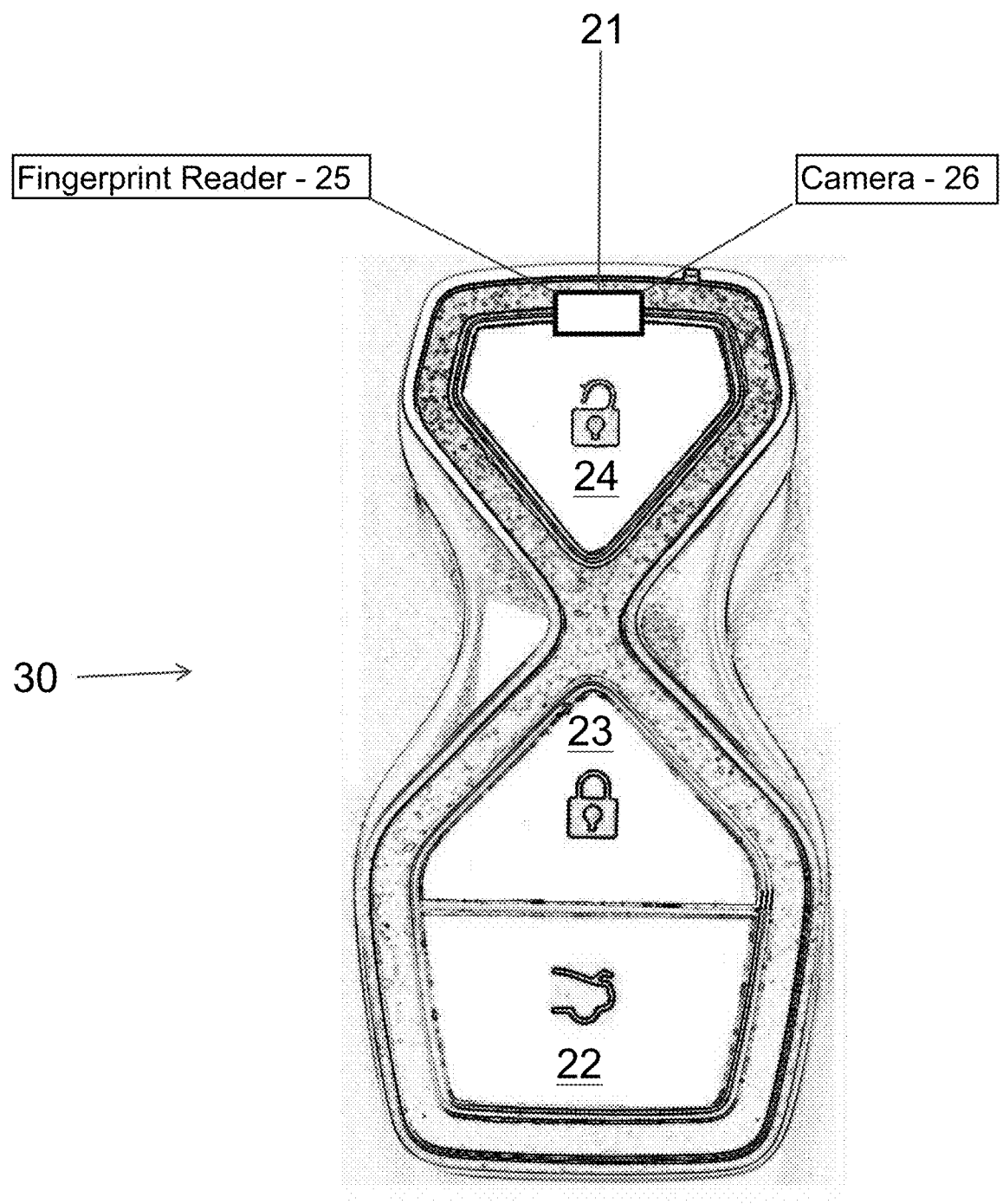
FIG. 4 is the front of a user device of the vehicle monitoring system
Figure 5:
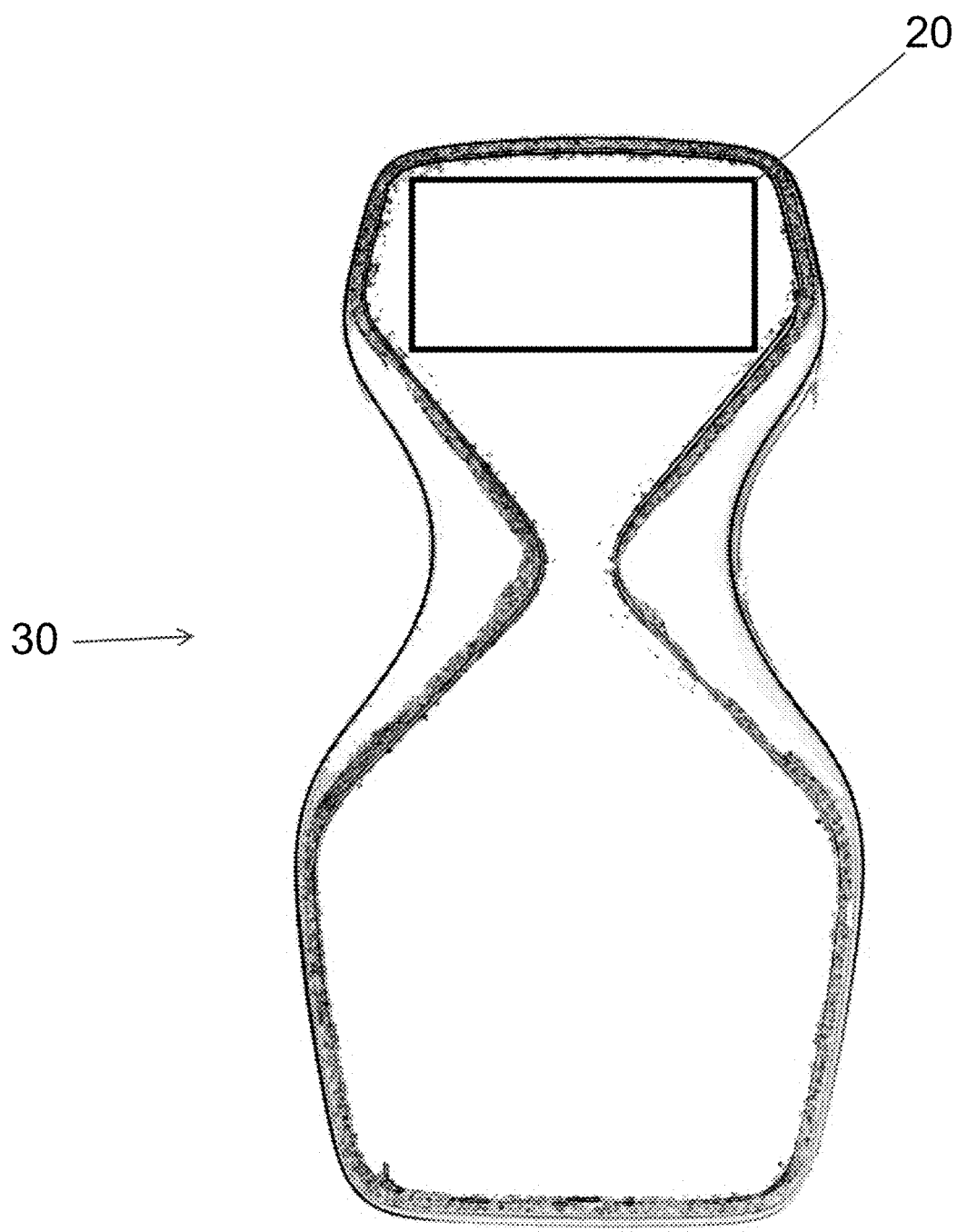
FIG. 5 is the rear of a user device of the vehicle monitoring system

FIGS. 4 and 5 illustrate an exemplary user device 30 (e.g. vehicle key fob) that includes the device display 20 that communicates with the sensor system 10 through known wireless or waveguide manner. The key fob 30 includes a security system reader 21. The security system reader 21 may include a fingerprint reader 25 and/or a camera 26 configured with a facial recognition system. The security system reader 21, for example, may be located in front of the key fob 30, however, other locations may be possible, such as the back of the key fob. The security system reader 21 may allow the user of the key fob to access the key fob functions, such as the lock 23, unlock 24, and open trunk 22 functions of the key fob 30. The user may configure the settings for the key fob in order to selectively choose whether the security system reader 21 is required to be passed in order to use the key fob 20. The security system reader 21 may also allow the user to access the display 20 located on the key fob. The user may disable or enable the security system reader 21 as desired within the vehicle control system 14.

When the vehicle control system 14 receives a data signal representative of an anomaly from the sensor system 10, video feed from the optical sensor will be sent to the display 20 of the key fob 30. Data representative of an anomaly may include readings from any of the sensors (capacitance and/or shock and/or motion) of the sensor bundles that exceed a certain threshold amount. This threshold may be set by the user, allowing the user to set the sensitivity of the monitoring system to the anomalies monitored by the sensors. This threshold amount may correspond to, for example, a force amount for a shock sensor positioned to detect forces or a range value (i.e., distance) for an object detected by a motion sensor monitoring the range between an object and the vehicle.

The user may change the range of the sensed movement by the motion sensor. For the capacitance sensor, the surface of the vehicle is monitored such that any conductive material (such as metal or human contact) will trigger the capacitance sensor. After the data signal representative of the anomaly is transmitted, the user may then enter a monitor mode to see the video feed of the area corresponding to the area of the anomaly. For example, if an object hits the right side door of the vehicle, video feed from the optical sensor providing the view of the right side door will be sent to the display 20. Depending on the user's settings, a live feed or a replay of the event may be sent to the display 20. The user may not access this feed unless the security system reader 21 is passed if the security system reader 21 is enabled.

The security system reader 21 communicates with the vehicle control system 14 through known wireless or waveguide manner. The authentication and verification of the fingerprint or facial data for the security system reader 21 is processed by the vehicle control system processor 15. The processor 15 of the vehicle control system 14 checks the fingerprint data or facial data received from the security system reader 21 with stored security information in the memory 16 of the vehicle control system 14. Once a match has been confirmed, the vehicle control system 14 will send a signal to the key fob 30 to unlock the functions of the key fob. The user of the vehicle may store the security information (e.g. fingerprint or facial data) of any desired persons the user wishes to allow access to display 20 or key fob 30. The initial user may be set by a manufacturer or an authorized dealer of the vehicle.

The replay of a detected or monitored event may be controlled via the key fob buttons (i.e. using the buttons 22/23/24 on the key fob as the video control). If a live feed is provided, the user may use a key fob button (22 or 23 or 24) to rewind the video feed in order to view past feed. The user may also choose to fast forward or pause the video feed using key fob buttons (22 or 23 or 24). An example control setup may be providing the unlock button 24 with a fast forward function, the lock button 23 with a rewind function, and the trunk open button 22 with a pause/play function. The vehicle control system 14 may communicate with the key fob 30 and display 20 through any known wireless or waveguide manner in order to provide the user with the desired video feed. The user may enable or disable the sensor system 10 or monitoring system 100 as desired. The signal range of the vehicle control system 14 depends on the method of broadcast method. The vehicle control system may broadcast the signal up to, for example, a 900 foot radius around the vehicle.

As discussed above, any of the sensor system 10, vehicle control system 14, user device 30, vehicle interface, and mobile device may be connected by any known wired, wireless, or waveguide manner.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the vehicle monitoring system as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present disclosure.

What is claimed is:

1. A monitoring system for a vehicle, the monitoring system comprising:
    a sensor system configured to sense motion around the vehicle and contact with the vehicle;
    a vehicle control system comprising a processor and a memory; wherein the vehicle control system communicates with the sensor system and is configured to receive and store sensor data received from the sensor system;
    wherein the control system sends, via the processor, optical data of the sensor system to a user device in response to sensor data received representing motion around the vehicle or contact with the vehicle; and
    wherein the user device is a key fob of the vehicle;
    wherein the key fob includes a security system reader comprising at least one of a fingerprint reader or a camera;
    wherein the security system reader is configured to send security data comprising fingerprint data or facial data to the vehicle control system to authenticate, via a processor, the security data of the security system reader by comparing the security data to a stored security data in the memory of vehicle control system to allow the user to access a display of the key fob configured to receive and display the optical data of the sensor system sent from the memory of the vehicle control system;
    wherein the key fob comprises one of a vehicle lock, vehicle unlock, and vehicle trunk unlock button; and
    wherein the vehicle lock, vehicle unlock, and vehicle trunk unlock button is configured to control the display of optical data from the memory of the vehicle control system received from the sensor system.

2. The monitoring system of claim 1, wherein the sensor data received representing motion around the vehicle or contact with the vehicle exceeds above a preset threshold data reading set by a user of the vehicle.

3. The monitoring system of claim 1, wherein the sensor system comprises of at least one sensor bundle comprising an optical sensor and at least one of a capacitance sensor, a motion sensor, and a shock sensor.

4. The monitoring system of claim 1, wherein the optical data is a replay of the motion around the vehicle or the contact with the vehicle.

5. The monitoring system of claim 1, wherein the optical data is a live feed of vehicle.

6. A vehicle comprising:
    a sensor system including at least one sensor bundle located on the perimeter configured to sense motion around the vehicle and contact with the vehicle;
    a vehicle control system comprising a processor and a memory configured to receive and store sensor data from the sensor system;
    wherein the control system sends, via the processor, optical data of the sensor system to a user device in response to sensor data received representing motion around the vehicle or contact with the vehicle;
    wherein the user device is a key fob of the vehicle;
    wherein the key fob includes a security system reader comprising at least one of a fingerprint reader or a camera;
    wherein the security system reader is configured to send security data comprising fingerprint data or facial data to the vehicle control system to authenticate, via a processor, the security data of the security system reader by comparing the security data to a stored security data in the memory of vehicle control system to allow the user to access a display of the key fob configured to receive and display the optical data of the sensor system sent from the memory of the vehicle control system;

wherein the key fob comprises one of a vehicle lock, vehicle unlock, and vehicle trunk unlock button; and wherein the vehicle lock, vehicle unlock, and vehicle trunk unlock button is configured to control the display of optical data from the memory of the vehicle control system received from the sensor system.

7. The vehicle of claim 6, wherein the sensor data received representing motion around the vehicle or contact with the vehicle exceeds above a preset threshold data reading set by a user of the vehicle.

8. The vehicle of claim 6, wherein the sensor system comprises of at least one sensor bundle comprising an optical sensor and at least one of a capacitance sensor, a motion sensor, and a shock sensor.

9. The monitoring system of claim 6, wherein the optical data is a replay of the motion around the vehicle or the contact with the vehicle.

10. The monitoring system of claim 9, wherein the optical data is a live feed of vehicle.

11. A vehicle monitoring system configured to monitor a vehicle remotely, the vehicle monitoring system comprising:
    a sensor system configured to sense motion around the vehicle and contact with the vehicle;
    a vehicle control system comprising a processor and a memory configured to receive and store data from the sensor system;
    a vehicle key fob in communication with the vehicle control system, wherein the key fob includes a security reader and a display;
    wherein the control system sends, via the processor, optical data received from sensor system from the memory of the vehicle control system to the user device in response to sensor data representing motion around the vehicle or contact with the vehicle;
    wherein the display is configured to show optical data when a user of the key fob has been authenticated by the vehicle control system from security data sent from the security system of the user device; and
    wherein the key fob comprises one of a vehicle lock, vehicle unlock, and vehicle trunk unlock button; and
    wherein the vehicle lock, vehicle unlock, and vehicle trunk unlock button is configured to control the display of optical data received by the sensor system.

* * * * *